Figure 1:
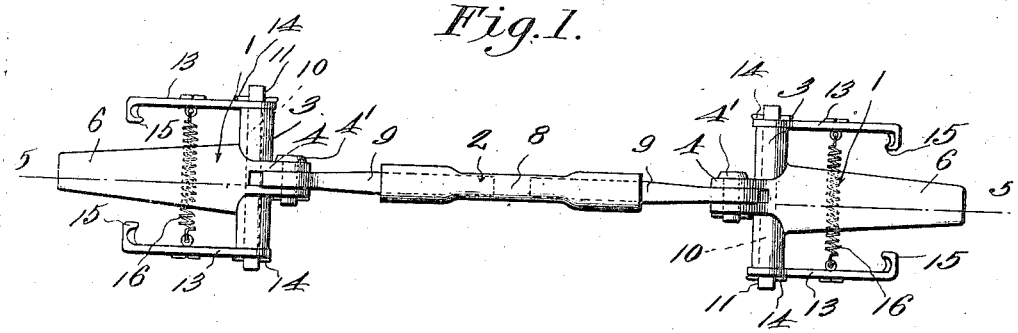

C. A. & J. R. PETERSON.
TIRE REMOVING TOOL.
APPLICATION FILED NOV. 25, 1916.

1,238,050.

Patented Aug. 21, 1917.
2 SHEETS—SHEET 1.

Witness
W. map. Duvall

Inventors
C. A. Peterson and
J. R. Peterson,
By Victor J. Evans
Attorney

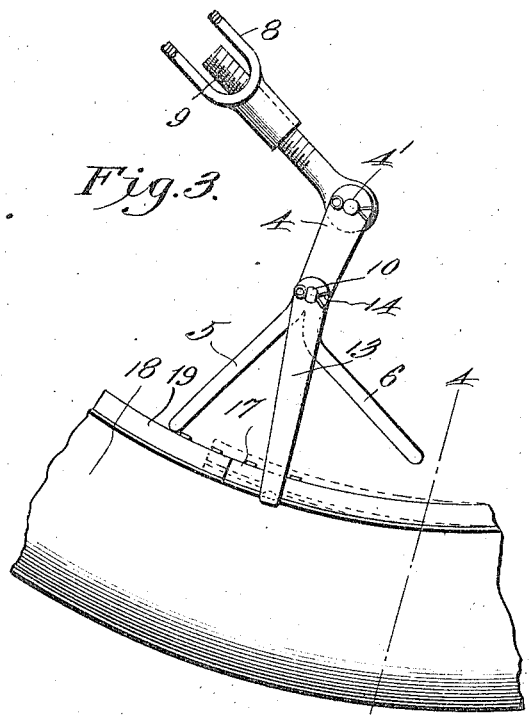
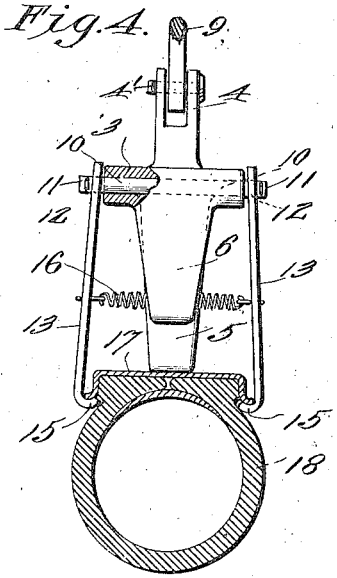
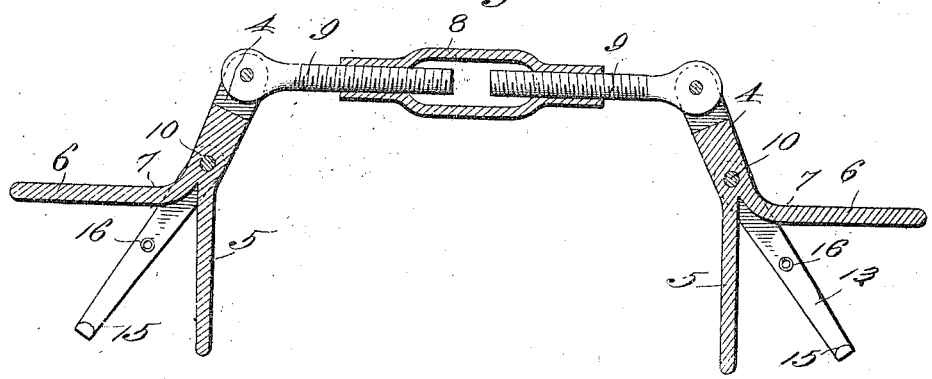

UNITED STATES PATENT OFFICE.

CHARLES A. PETERSON, OF FIELDS LANDING, AND JOHN R. PETERSON, OF SAWYERS BAR, CALIFORNIA.

TIRE-REMOVING TOOL.

1,238,050.   Specification of Letters Patent.   Patented Aug. 21, 1917.

Application filed November 25, 1916. Serial No. 133,426.

*To all whom it may concern:*

Be it known that we, CHARLES A. PETERSON and JOHN R. PETERSON, citizens of the United States, residing at Fields Landing, in the county of Humboldt, and at Sawyers Bar, in the county of Siskiyou, respectively, and State of California, have invented new and useful Improvements in Tire-Removing Tools, of which the following is a specification.

This invention relates to improvements in means for facilitating the removal of demountable rims from pneumatic tires.

In carrying out our invention it is our purpose to produce a simple, cheap and reliable device which may be easily and quickly actuated to bring the split ends of the rim away from engagement with each other, to contract the ends of the rim whereby to reduce the diameter thereof to permit of the ready removal of the rim from the tire casing, and also to expand the rim at the split ends thereof to bring the ends into engagement with each other when it is desired to replace the rim upon the tire casing.

We accomplish the foregoing objects by a construction similar to that illustrated by the accompanying drawings, it being understood, however, that the nature of the invention is such that the same is subject to modifications in form, shape, design, etc., all of which modifications fall within the scope of the appended claims.

Figure 2:
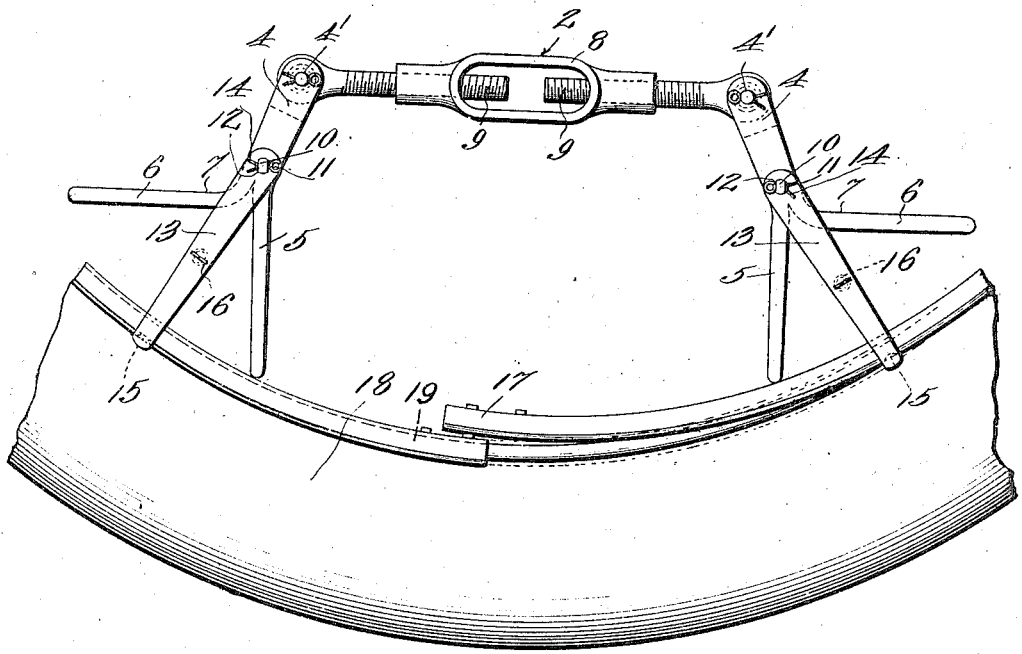

In the drawings:

Figure 1 is a top plan view of the improvement,

Fig. 2 is a side elevation illustrating the arrangement of parts when the device is employed for contracting the split detachable rim so that the same may be removed from the tire casing, Fig. 3 is a view illustrating the arrangement of parts when the device is employed to unseat or elevate one of the edges of the split rim, Fig. 4 is a sectional view approximately on the line 4—4 of Fig. 3, and Fig. 5 is a sectional view approximately on the line 5—5 of Fig. 1.

Our improved tool comprises end members 1—1 and a connecting member 2 for the said ends. The ends 1 are each of a similar construction, each including a hub 3 that is centrally formed with an offset member or lug 4, and this lug has its free end centrally bifurcated to receive the ends of the connecting member 2, the said ends being pivotally secured to the said lug, as at 4'. The hub 3 diametrically opposite the lug 4 is integrally formed with angularly disposed oppositely extending lever or fulcrum members 5 and 6 respectively, the lever 6 at a suitable distance from its connection with the hub being arranged at approximately a right angle with respect to the plane of the lug 4, as indicated by the numeral 7, and as clearly illustrated by the drawings.

The connecting member 2 comprises a longitudinally adjustable element and in the construction illustrated by the drawings the end members thereof are in the nature of bolts, the threads of the bolts being arranged at an opposite pitch and the central member is in the nature of a turnbuckle and is indicated by the numeral 8, the said turnbuckle engaging with the oppositely pitched threads of the bolt members 9—9 provided, as stated, the ends of said member 2.

The hub 3 has journaled therein and extending therethrough a shaft member 10, and the ends of said shaft projecting beyond the ends of the hub are preferably rectangular, as at 11, but the corners of said ends 11 are rounded. These ends 11 are adapted to receive substantially rectangular openings 12 provided in the upper ends of arms 13 and the said arms 13 are secured to the ends of the shaft 10 preferably by cotter pins 14 passing through the said ends of the said shaft 10. The ends of the arms 13 are inturned or hooked, as at 15, and the arms 13 are connected by contractile spring 16. It is to be understood that the connection between the arms 13 and the shaft 10 permits of a longitudinal and swinging movement of the said arms upon the ends 11 of said shaft and whereby the hooked ends of said arms are normally disposed toward each other, while the rectangular ends of the shaft retain the arms in alinement.

When it is desired to remove a rim from a tire, the lug strap of the split rim is disengaged from its retaining lugs and the device is positioned as illustrated in Fig. 3 of the drawings, the spring arms 13 having their hooked ends 15 engaging with the end 17 of the rim while the arm 5 of the fulcrum member is swung into contacting engagement with the end 19 of the split rim. The turnbuckle 8 is grasped by the operator and a vigorous pull is exerted thereupon, it being noted that the said turnbuckle is arranged at an angle with respect to the jointed end of the rim, and as the arm 5 serves as a fulcrum element the end 17 will be readily moved away from the tire 18 and the end 19 of the rim and the said end 17 will be brought over the end 19 of the said rim.

By this arrangement it will be noted that the end 17 of the rim is pried away from the end 19, but we may also spring or contract the rim until the diameter thereof is less than the diameter of the automobile tire or casing 18 so that the same can be lifted or placed upon the tire or casing without being pried, and to accomplish this we arrange the device in a position as illustrated in Fig. 2 of the drawings, the spring members 13 being approximately equally spaced from the meeting ends 17 and 19 of the rim, and the arms 5 are swung into contacting engagement with the sections 17 and 19 of the rim. The turnbuckle 2 is turned upon the bolt members 9 to bring the confronting ends of the said bolts 9 toward each other lessening the distance between the hubs 3 and as the rim is firmly held by the fulcrum members 5—5, the periphery of the rim becomes less and less until the same can be readily removed from the casing or tire 8 it, of course, being understood that one of the ends of the rim is by the first action of the turnbuckle raised above the other end of the rim and thereafter causing the end 17 (in Fig. 2) to travel over the other end 19.

When the ends of the rim are in overlapping position and it is desired to expand the said rim to bring the ends thereof into contacting engagement, as when the rim is to be arranged upon the tire or casing 18 the ends of the fulcrum members 6 are swung to contacting engagement with the rim, to the opposite sides of the split end thereof, the spring pressed arms 13, of course, engaging with the ends 17 and 19 of the rim. The turnbuckle 2 is operated to cause the bolts 9 to move away from each other to increase the distance between the members 1—1 and consequently simultaneously slide or move the lapped ends of the rim away from each other to bring the same into circumferential alinement and, of course, into proper engagement with the tread member 18. The apparatus may be readily removed from the rim by adjusting the thumb crew and swinging the spring pressed members 13 away from each other and from the rim.

Having thus described the invention, what we claim is:

1. A tool for the purpose set forth including end members and a connecting member for the said end members, each of said end members including a hub, a lug extending from the hub in one direction, angularly disposed levers extending from the hub in another direction, a pivotal connection between the lug and the connecting member for the ends, a shaft passing through each of the hubs and having non-circular ends, arms upon the said ends of the shaft, retaining means for the arms, each of said arms having its end inturned to provide a hook, contractile springs connecting each of the arms, and adjustable means for the connecting member.

2. In a tool for the purpose set forth, end members and a connecting member for the end members, each of said ends including a hub, a lug extending from the hub in one direction, angularly disposed levers connected with the hub and extending therefrom in an opposite direction, a shaft for the hub having non-circular ends projecting beyond the hub, arms having openings to receive the ends of the shaft whereby the said arms are loosely connected with the shaft, and means for retaining the arms upon the shaft, said arms having their ends inturned, a contractile spring connecting each pair of arms, the connecting member including bolts which are pivotally connected with the lugs for the end members and which have their threads disposed at an opposite pitch, and a turnbuckle connecting the bolts.

In testimony whereof, we affix our signatures.

CHARLES A. PETERSON.
JOHN R. PETERSON.